Patented Nov. 13, 1928.

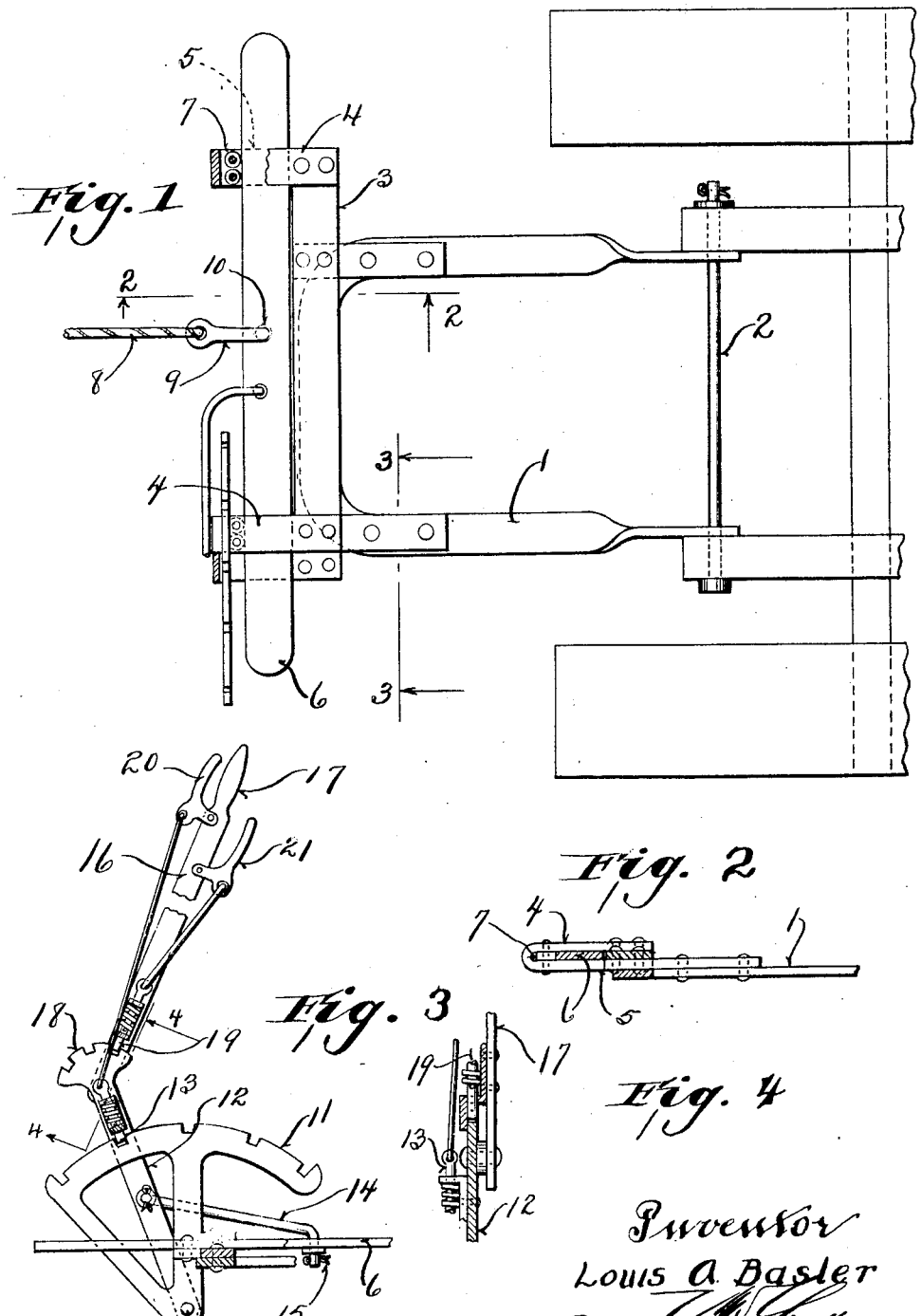

1,691,560

UNITED STATES PATENT OFFICE.

LOUIS A. BASLER, OF HARTFORD, WISCONSIN.

TRACTOR HITCH.

Application filed January 29, 1927. Serial No. 164,572.

This invention relates to tractor hitches.

In plowing with tractors, it is frequently the case that the work has to be done on the side of a hill. The plow or other implement which is trailed after the tractor slides downwardly on the hill and can not be held straight by the ordinary methods.

This invention is designed to overcome the defects noted above and objects of such invention are to provide a novel form of tractor hitch which is so constructed that the point at which the plow or other trailed implement is attached, may be shifted to either side of its normal position so that the plow can be correctly drawn after the tractor, although the work is done on the side of a hill.

Further objects are to provide a tractor hitch which consists of a frame secured to the tractor and free to pivot about a horizontal axis, but restrained against rocking motion about a vertical axis, and to provide a sliding bar controlled in a novel manner and carried by the frame and having means for attachment to the implement.

Further objects are to provide a novel mechanism for shifting the transversely slidable bar which is so constructed that an excessive reach is not required of the operator, such shifting means consisting in effect of a composite lever having two main portions joined and adapted to swing relatively to each other so that the operator is not required to reach a great distance from one extreme position of the shifting mechanism to the other.

An embodiment of the invention is shown in the accompanying drawings in which:—

Figure 1 is a plan view of the device partly in section showing the rear end of the tractor with the device attached thereto;

Figure 2 is a sectional view on the line 2—2 of Figure 1;

Figure 3 is a sectional view on the line 3—3 of Figure 1;

Figure 4 is a sectional view on the line 4—4 of Figure 3.

Referring to the drawings, it will be seen that the device comprises a main frame 1 which, as shown in the drawings, is provided with a U-shaped portion having its ends pivotally joined by means of a transverse shaft 2 to the tractor. This permits vertical swinging of the frame but restrains the frame against horizontal swinging. Obviously, other modes of attaching the device can be employed for other types of tractors.

This main frame is provided with a transverse portion 3 which carries upper and lower guides 4 and 5 between which a transversely slidable bar 6 is mounted. Preferably, this bar 6 is guided by means of rollers 7 mounted rearwardly thereof to reduce the friction when the load is placed upon the bar by the trailed implement. The implement is attached to the bar in any suitable manner, as by means of the connector 8 which terminates in a hook or eyelet portion 9, such eyelet portion entering an aperture 10 in the bar 6.

The frame also carries a notched sector 11 to which is pivoted the main lever 12. This lever is provided with a spring pressed plunger 13 adapted to enter any of the notches in the segment 11. The lever 12 is connected by means of a link 14 with the bar 6, as shown most clearly in Figure 3, so that when the lever 12 is rocked the bar 6 is shifted to one or the other side of its neutral position, and is thus moved transversely of the main frame 1. Preferably, the link 14 has angularly turned ends which fit in the lever 12 and in the bar 6, such ends receiving split pins or similar members 15 to prevent inadvertent withdrawal thereof.

In order to limit the necessary reach for the operator, the shifting lever is made of two parts consisting of the main lever 12, previously described, and the lever 16 which terminates in the handle 17, the two levers together forming jointly a hand lever for shifting the bar 6. It is to be noted that the upper end of the lever 12 is provided with a notched segment 18 and that the lever 16 carries a spring pressed plunger 19 adapted to enter any of the notches in the segment 18. The two plungers 13 and 19 are operated respectively by means of hand grips 20 and 21 pivoted adjacent the handle 17 of the lever.

In using the device, the operator rocks the composite lever one way or the other to shift the point of attachment of the trailing implement. Obviously, if he has to swing the lever 12 a material distance beyond its central position he may first rock the lever 16 with reference thereto and lock it by means of the pawl 19, thus positioning the handle within easy reach. Thereafter he may rock the entire composite lever and subsequently lock the parts in position by means of the pawl 13, as shown in Figure 3.

Thus, it will be seen that novel means have been provided for shifting the point of attachment of the drawn implement to accommodate various conditions of work.

It will be seen further that the levers are so constructed that the operator is not required to reach a great distance, but may conveniently shift the levers without materially exerting himself.

Further, it will be seen that the device is extremely rugged and of simple and reliable construction.

Although the invention has been described in considerable detail such description is intended as illustrative rather than limiting as the invention may be variously embodied and as the scope of such invention is to be determined as claimed.

I claim:

1. A tractor hitch for a trailing implement comprising a frame for attachment to a tractor, a transverse slide carried by said frame and having means for attachment to the trailing implement, a hand lever pivotally mounted upon said frame, a link connecting said lever and said slide, and means for locking said lever in any one of a plurality of adjusted positions, said lever being formed of two pivotally joined portions having relative rocking motion, and means for locking said portions together in any one of a plurality of relative positions of adjustment.

2. A tractor hitch comprising a frame for attachment to a tractor, a slidable bar carried transversely of said frame and having means for attachment to a trailing implement, a main lever pivoted to said frame and connected by a link with said bar, a segmental notched rack carried by said frame, a spring pressed locking plunger carried by said lever for engaging in the notches of said rack, a hand lever pivoted to said main lever, said main lever having a notched segmental rack, a spring pressed plunger carried by said hand lever for engaging in the notches of said second rack, and means carried by said hand lever for retracting said plungers.

3. A tractor hitch comprising a frame for attachment to a tractor, a slidable bar carried transversely of said frame and having means for attachment to a trailing implement, a main lever pivoted to said frame and connected by a link with said bar, a segmental notched rack carried by said frame, a spring pressed locking plunger carried by said lever for engaging in the notches of said rack, a hand lever pivoted to said main lever, said main lever having a notched segmental rack, a spring pressed plunger carried by said hand lever for engaging in the notches of said second rack, means carried by said hand lever for retracting said plungers, and rollers carried by said frame for bearing the rearward pull of said slidable bar.

In testimony that I claim the foregoing I have hereunto set my hand at Milwaukee, in the county of Milwaukee and State of Wisconsin.

LOUIS A. BASLER.